May 29, 1962  W. F. ELLIOTT ETAL  3,036,842
DEMOUNTABLE VEHICLE BOGIE

Filed Aug. 19, 1957  5 Sheets-Sheet 1

INVENTORS
WILLIAM F. ELLIOTT
WALTER J. FRISCH
BY

Wheeler, Wheeler & Wheeler
ATTORNEYS

May 29, 1962 W. F. ELLIOTT ETAL 3,036,842
DEMOUNTABLE VEHICLE BOGIE
Filed Aug. 19, 1957 5 Sheets-Sheet 4

INVENTORS
WILLIAM F. ELLIOTT
BY WALTER J. FRISCH

Wheeler, Wheeler & Wheeler
ATTORNEYS

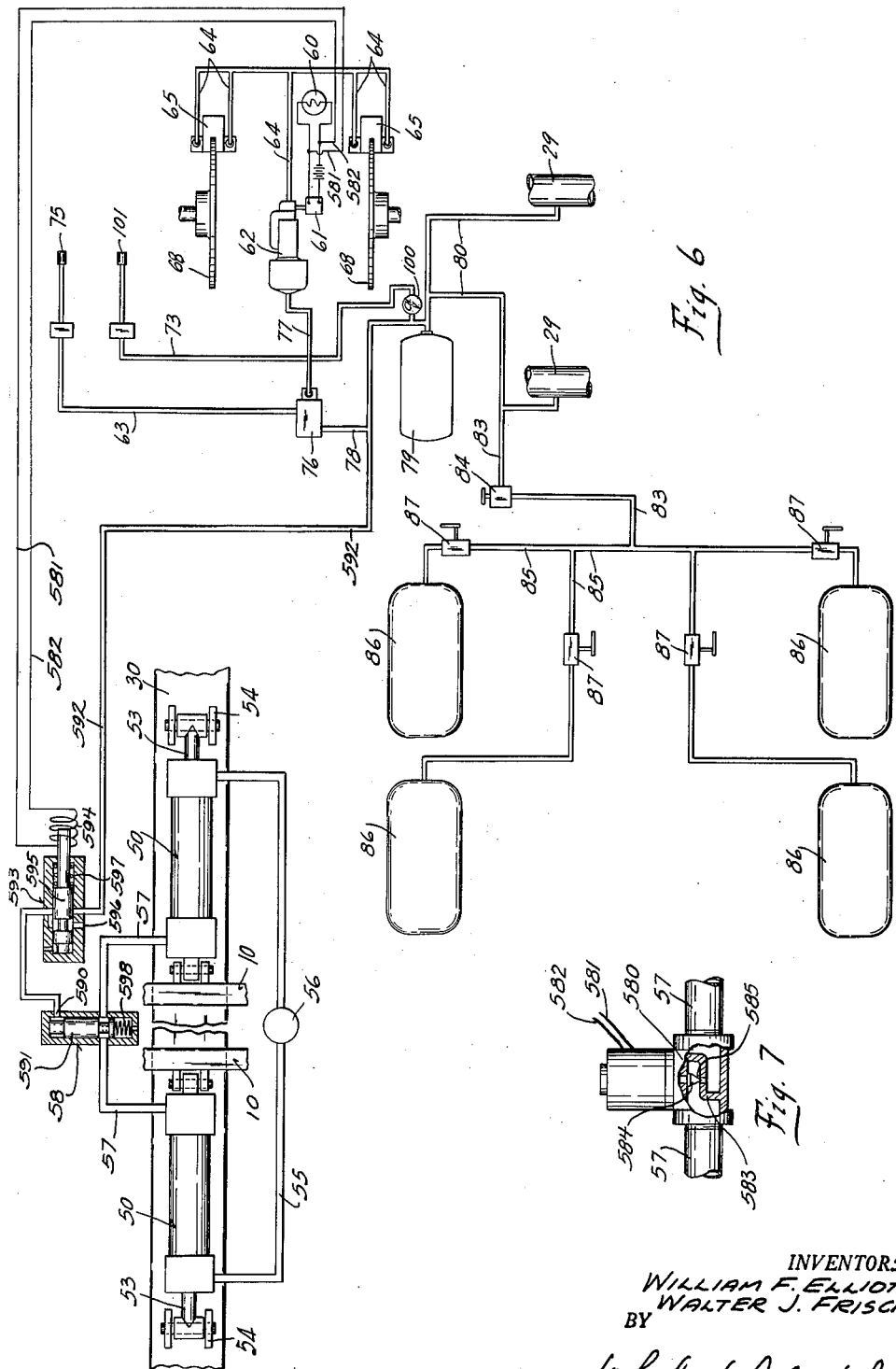

3,036,842
DEMOUNTABLE VEHICLE BOGIE
William F. Elliott, Clintonville, Wis., and Walter J. Frisch, Campbell, Calif., assignors to FWD Corporation, a corporation of Wisconsin
Filed Aug. 19, 1957, Ser. No. 678,887
7 Claims. (Cl. 280—81)

This application relates to a demountable vehicle bogie with automatic tilt control and a geared brake drum.

It consists of a bogie which is readily attachable to a vehicle and is likewise very readily removed. It is particularly adapted for use with a trailer from which the wheels must periodically be removed while the bed of the trailer is being used for purposes other than hauling. However, the bogie may also be used as an undriven extra support axle for any vehicle, powered or unpowered.

The bogie of our invention provides an unusually effective braking system, due to the use of a gear train between the wheels and the brake drum to increase the speed at which the brakes operate relative to the wheels. It also has a unique interconnection of the fluid pressure shock absorbing system and brake system which automatically locks the shock absorbers upon application of the brakes to prevent tilting due to the braking torque, and which can be manually locked to keep the main frame of the bogie upright when the bogie is removed from the vehicle to which it is attached. Reserve pressurized fluid is stored in tubular frame members to operate the system.

In the drawings:

FIGURE 6 is a diagrammatic representation of the hydraulic system of the bogie, including two of the shock absorbers.

FIGURE 7 is a diagrammatic showing of a modified form of lock for the vehicle's shock absorber system.

The bogie consists generally of a main frame 10 made up of front member 11, rear member 12 and a plurality of cross members 13.

Figure 3:
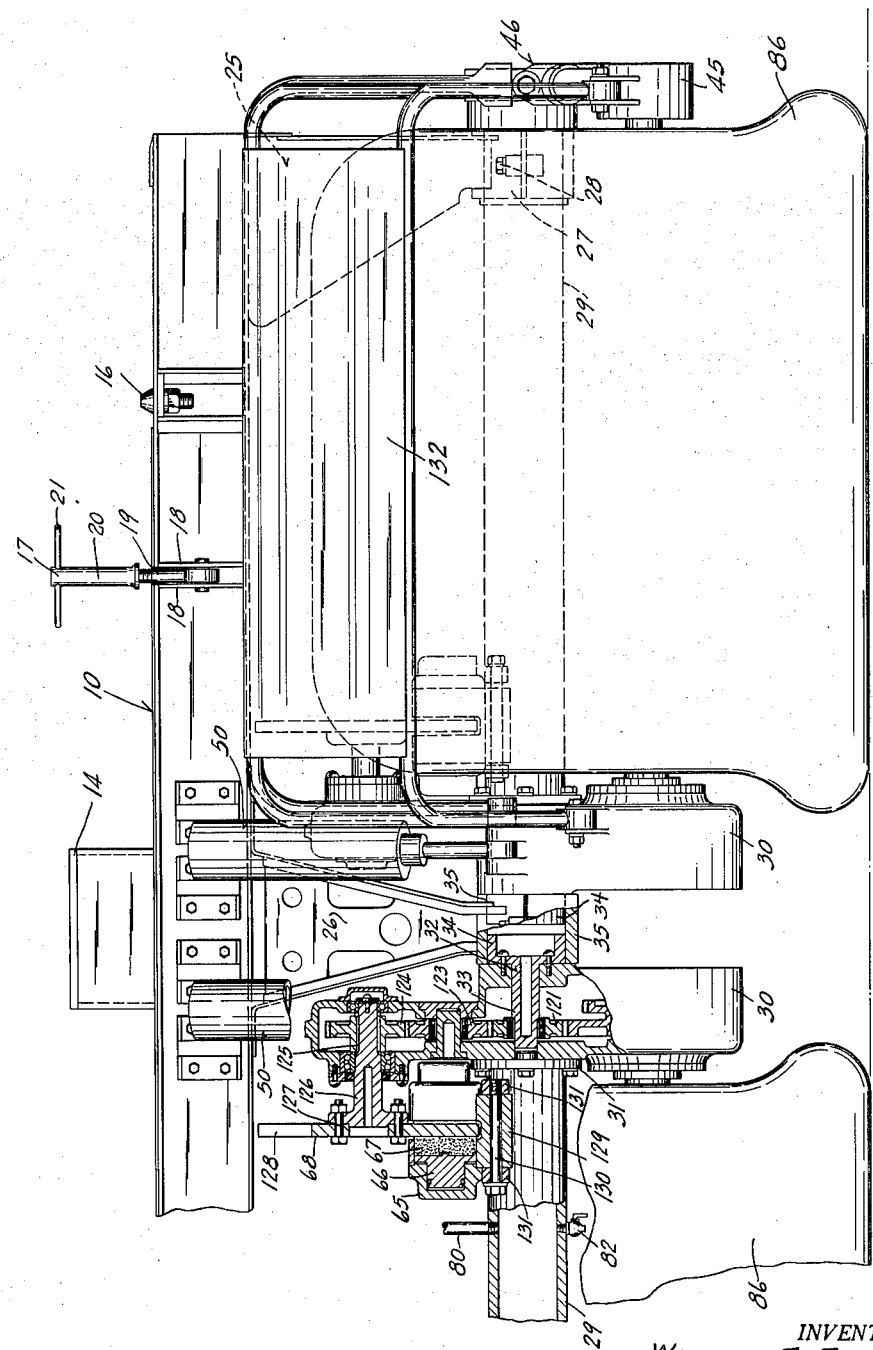
FIGURE 3 is a front elevational view of the bogie with portions of the left side shown in cross section.

The main frame further comprises end supports 25 at each end and a center support 26 (see FIG. 3). End supports 25 terminate in split sleeves 27 which are provided with radial flanges which are bolted together at 28.

Journaled in these split sleeves 27 and in a similar split sleeve 35 at the center of the bogie, are two independently oscillatable subframes. Each subframe comprises an end frame 46, torque tube 29, gear case 30, and two pneumatic bags, one in front of the pivotal axis of the subframe and one behind it. The torque tube 29 of each subframe is journaled for oscillation respecting the main frame in split sleeve 27 at its outer end. As shown at the left side of FIGURE 3 the inner end of each torque tube 29 is secured to a gear case 30 by means of a radial flange 31, which is bolted or otherwise secured to the gear case. Support member 32 is secured to gear case 30 on the axis of each torque tube and consists of a stub shaft portion 33 which serves as a gear axle and a cup-shaped portion 34 which is journaled for oscillation in split sleeve 35. As may be seen in FIG. 3 the opposed portions 34 of members 32 of aligned subframes are journaled in the sleeve 35.

The outer end of each torque tube beyond sleeve 27 is fixed to end frame 46 (see FIG. 1) which comprises an end cap 40 fixed to torque tube 29 and secured to frame members 41, which terminate in mounting blocks 42.

Mating mounting blocks 43 are bolted to blocks 42, from which frame members 44 lead to wheel bearing supports 45.

Figure 5:
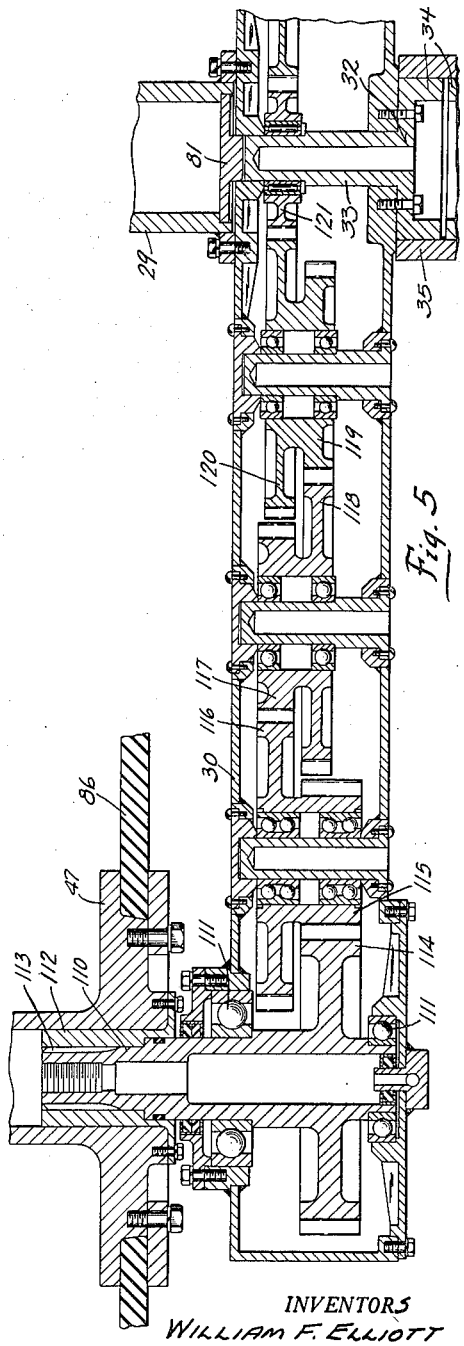
FIGURE 5 is a cross sectional view of the gear case on line 5—5 of FIGURE 4.

Wheels 47 carrying the pneumatic bag rollers are mounted on bearing supports 45 by means which are shown in our pending application No. 660,598, since issued as Patent No. 2,986,226, and hence will not be described here, as they are not a part of the present invention. A portion of a wheel 47 and the means mounting it on gear case 30 are shown in FIG. 5 and will be described later in connection with the braking system.

The tilting of the subframe with respect to the main frame of the bogie is controlled and limited by fluid pressure cylinders 50, one of which is attached between each side of each gear case 30 and frame work 10. Frame work 10 is provided with parallel sets of ears 51 between which cylinders 50 are pivotally mounted by means of pins 52 which enter bores in ears 51. The piston and piston rod assembly 53 is similarly pivotally mounted between ears 54 on gear cases 30.

The fluid connections to cylinders 50 are shown in FIGURE 6. This figure shows one gear case 30, the main frame 10, and two cylinders 50 interconnecting the ends of the gear case with the main frame. The other gear case 30 may be similarly connected and so is not shown in this figure. Fluid pressure lines 55 and 57 respectively connect the lower ends and the upper ends of the pair of cylinders.

Fluid line 57 is controlled by a fluid pressure operated valve 58, and line 55 is controlled by manually operated valve 56. Lines 55 and 57 are normally open to permit fluid flow between the respective cylinders 50, upon tilting of the subframes 46 with respect to the main frame 10, due to road shocks or uneven terrain. However, lines 55 and 57 are of such a size that the fluid flow is restricted, thus giving a shock absorbing action which damps the movements of the subframe.

Upon application of the brakes of the bogie, the subframes tend to tilt to an extreme degree because the main frame tends to move ahead, while the brakes restrain the pneumatic bags 86 on the subframes. However, fluid pressure operated valve 58 in fluid line 57 is provided with actuating pressure by the fluid system which applies the brakes, thus preventing this motion.

In the arrangement shown in FIG. 6, valve 58 consists of a spring loaded spool type valve having a port 590 for the admission of high pressure fluid to the end of the valve casing to push spool 591 to a position in which conduit 57 will be closed, thus preventing relative movement between the piston and the cylinder which interconnect the main frame and the subframe, temporarily locking them in whatever position they happen to be. The actuating fluid which enters port 590 is supplied from reservoir 79 by conduit 592 and is controlled by solenoid valve 593. This solenoid valve is actuated by electricity carried by wires 581 and 582 which are connected in parallel with brake light 60. When pressure switch 61 in the brake system is actuated to turn on the brake light, current is simultaneously supplied to solenoid coil 594, pulling valve element 595 from a position in which port 590 is vented to the outside air at 596, to a position in which pressure fluid in line 592 is supplied to port 590. Upon releasing the brake, switch 61 opens, deenergizing solenoid coil 594 and allowing spring 597 to close conduit 592 and uncover vent 596. This releases the fluid pressure acting on valve spool 591, permitting spring 598 to return it to a position in which conduit 57 is uncovered, again permitting relative movement between gear case 30 and main frame 10 of the bogie.

In FIGURE 7 an alternate method of accomplishing the same result is shown. In this figure the current from wires 581 and 582 actuates solenoid valve 580 by lifting needle valve 584 from seat 583, creating a small opening at 585. Valve 580 controls fluid conduits 57 directly. Due to space limitations, however, it is impractical to provide a solenoid valve having a flow rate as great as that of fluid line 57, so that the flow rate of the valve becomes the limit for the entire system and determines the amount of shock absorption that is obtained.

Applicants prefer the pressure actuated valve 58 rather than the solenoid valve 580 for control of fluid line 57 because it has been discovered that in most instances space will not permit the use of a sufficiently large solenoid valve to obtain proper shock absorption.

The brakes are applied by pressurizing fluid line 63 through quick-disconnect fitting 75, which attaches to a fluid pressure line (not shown) on the vehicle to which the bogie is attached.

The braking system of the vehicle to which the bogie is attached, or of the towing vehicle if the bogie is on a trailer, should preferably be arranged to supply fluid pressure to line 63 whenever the brakes are actuated, though independent control is also contemplated. Pressure in line 63 actuates valve 76 to release stored fluid under pressure from reservoir 79 to permit fluid pressure to enter line 77 and thence power cluster 62. The industry knows the power cluster as a device for converting moderate fluid pressure to very high pressure at lower flow rates. One such device is shown in Wagner Electrical Corporation Bulletin KU-205-13 published and copyrighted in November 1953.

The torque tube 29 desirably provides supplemental reservoir capacity as hereinafter described and is connected to reservoir 79 to provide fluid subject to the control of valve 76 as aforesaid. Fluid lines 64 transmit the high pressure from power cluster 62 to brake cylinders 65. Pistons 66 (see FIGURE 3) in cylinders 65 are provided with brake shoes 67 which bear on the brake drums, which here comprise disks 68. It will be noted that similar cylinders 65 are located on each side of disk 68 to equalize the pressure.

At the same time that pressure is transmitted through line 64 to the brake cylinders, pressure is also transmitted to close switch 61, turning on brake light 60 and actuating solenoid valve 593 or 580, thus locking cylinders 50 and preventing tilting of the subframe due to braking.

Fluid under pressure for the braking system is supplied to the bogie by pick-disconnect coupling 101 and is transmitted through line 73 to check valve 100 and thence to reservoir 79. Lines 80 (see also FIG. 3) connect reservoir 79 with torque tubes 29, which are sealed at the inner ends by end plates 81 (see FIG. 5) and at their outer ends by end caps 40 to serve as additional reservoirs for fluid pressure. It will be noted in FIG. 3 that a drain cock 82 is provided on the lower side of torque tube 29 so that any accumulation of condensate in torque tube 29 may be drained. Fluid pressure line 78 supplies fluid from the reservoir and torque tubes to relay valve 76 to actuate the brakes as above described.

The brake disk 68 is slotted at 128 for efficient cooling and to provide a channel of escape for dirt wiped from the surface of the disk by the shoes 67. The efficiency of the brake is greatly increased by the gear train between the axle 110 and the brake, since the brake rotates at many times the speed of the axle. Brake cylinders 65 are attached by means of housing 129 and bolts 130 to ears 131 on torque tube 29. Pressure lines 64 to cylinder 65 are flexible in order to accommodate the tilting of the subframe. The entire drive train between the axle and the brake is contained in the subframe, and is not affected by the tilting of the subframe with respect to the main frame.

Figure 4:
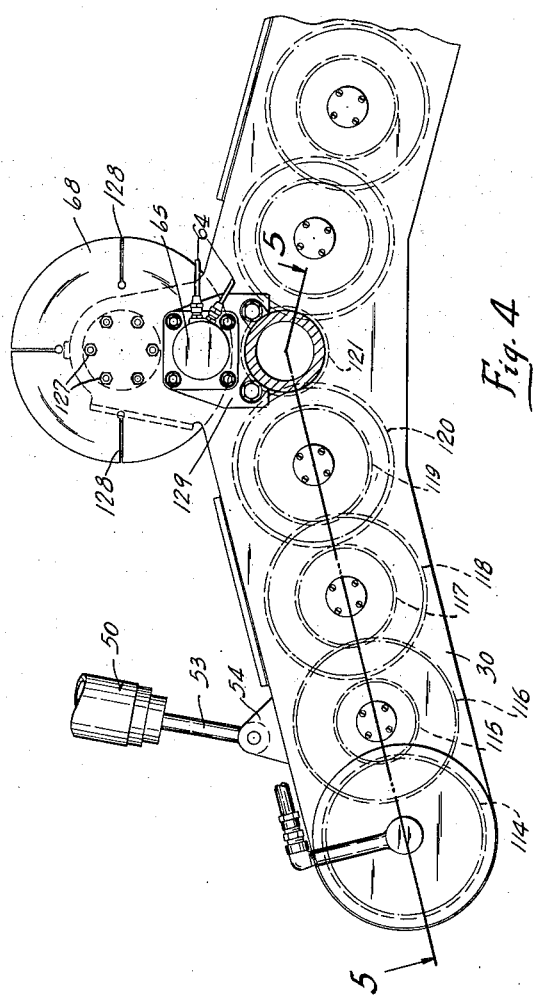
FIGURE 4 is a side elevational view of one of the gear cases with the torque tube shown in cross section.

The method of transmitting braking torque from the disc 68 to the wheels 47 is illustrated in FIGURES 3, 4, and 5. These figures show the pneumatic bags 86 supporting the gear case 30 through wheel 47, axle 110 and bearing 111. Axle 110 is splined to wheel hub 112 at 113 and carries gear 114 at the other end. From that point the gear train proceeds through gears 115, 116, 117, 118, 119, 120, and 121 to the level of the torque tube 29. Gear 121 is supported on stub shaft 33 which is co-axial with torque tube 29, as previously described. This part of the drive train is duplicated on each side of gear case 30 (see FIG. 3) except for gear 121 and shaft 33 which are common to both sides. From this point upward there is a single gear train consisting of gears 123 and 124, the latter being splined at 125 to shaft 126. Shaft 126 is secured by suitable means such as bolts 127 to brake disk 68 upon which brake shoes 67 operate.

Pressure line 83 carries fluid under pressure from torque tube 29 and reservoir 79 to master pressure regulator 84 and thence to branches 85, each of which leads to a single pneumatic bag 86 and has its own pressure regulator 87. Pressure regulators 84 and 87 may be a type which may be remotely controlled from the driver's compartment of the vehicle but in the preferred form they are hand controlled. This eliminates the necessity for separate, detachable pressure lines from the vehicle to the bogie for each bag, and yet enables the fluid pressure in the bags to be varied for changed conditions. The regulators admit fluid from the reservoir and torque tubes to maintain the required pressure, and release it to the atmosphere if pressure in the bags is too high. Air is the preferred fluid for this application.

The center cross members 13 of the main frame support an incomplete box 14 having a key slot 15 in its upper surface to receive a pin (not shown) which projects downwardly from the trailer 24 or other vehicle to which the bogie is to be attached. The front and rear frame 11 and 12 are provided with locating pins 16 to interlock with mating seats (not shown) on the vehicle. Four clamps 17 each consist of ears 18 secured to the frame of the bogie between which a threaded rod 19 is pivotally mounted. An elongated nut 20 is provided with a handle 21 so that it may be screwed down on a conventional attaching flange 150 on the vehicle which is slotted at 151 to receive rod 19 but not nut 20 (see FIG. 1).

Figure 1:
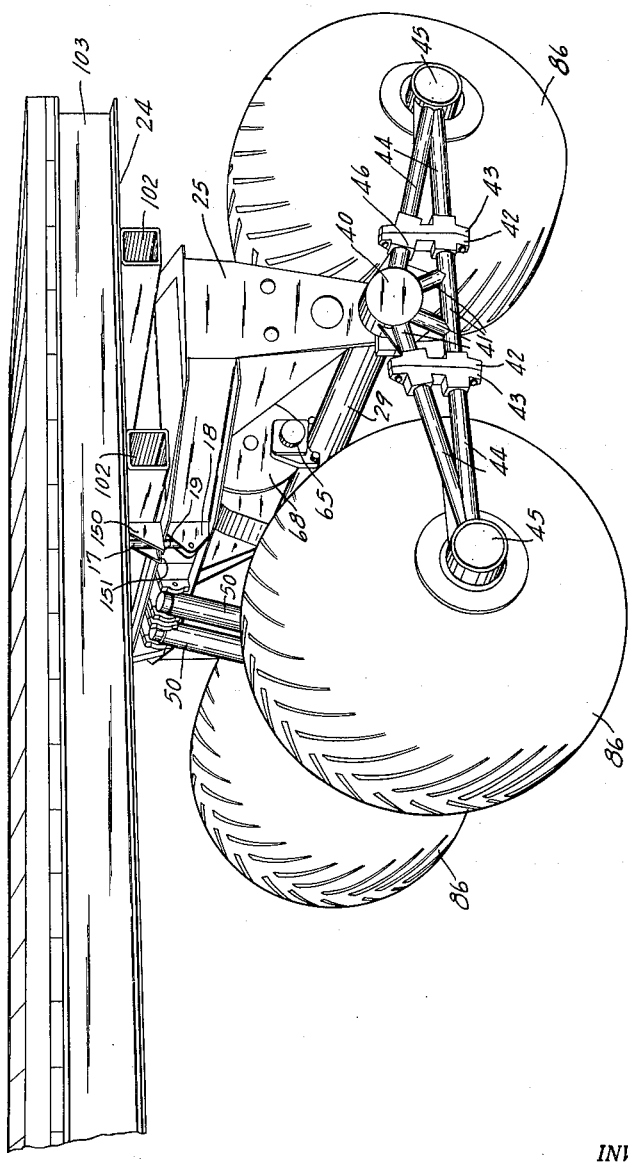
FIGURE 1 is a side perspective view of a trailer to which the bogie of our invention is attached.
Figure 2:
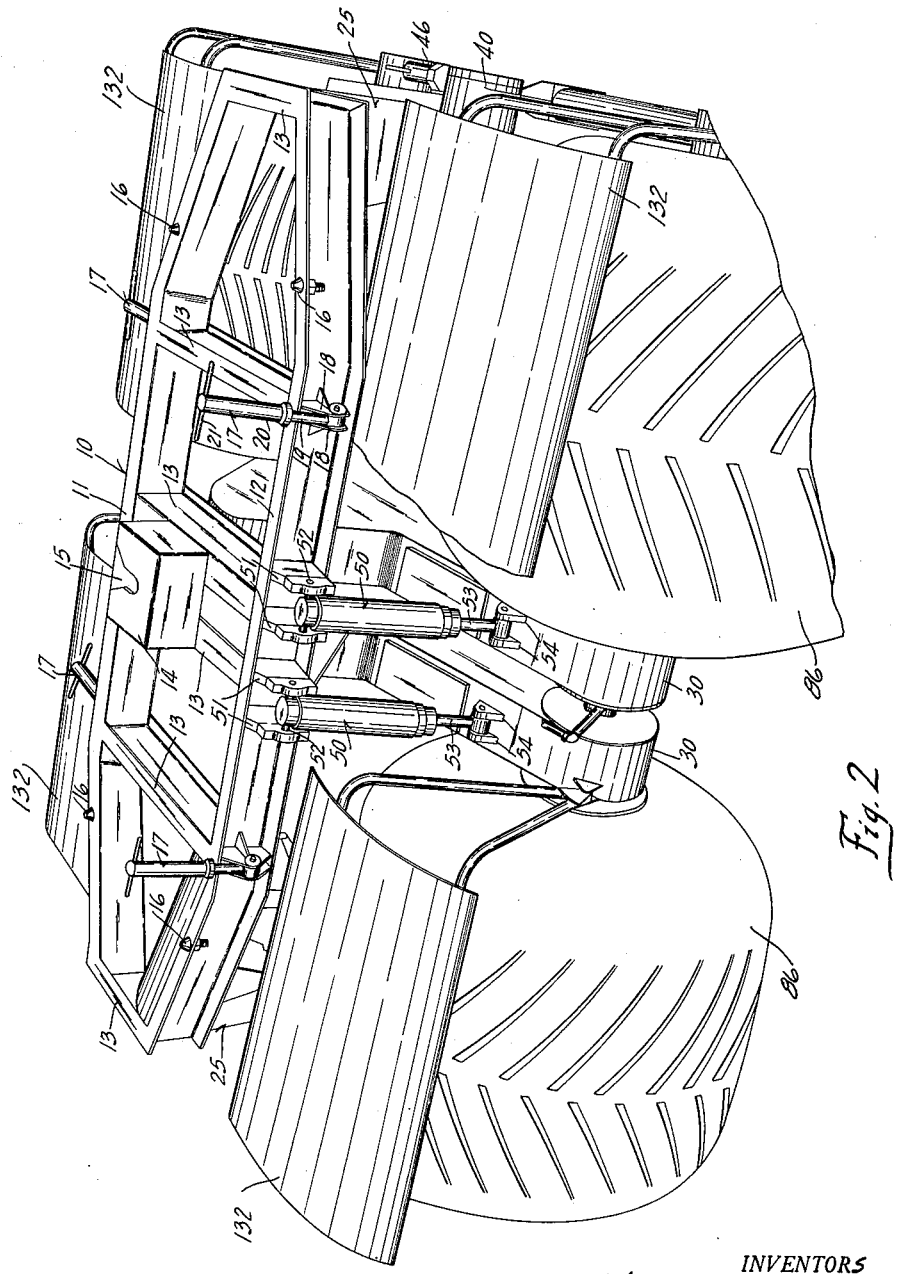
FIGURE 2 is a perspective view of the bogie alone.

The bogie may be removed from the vehicle by unscrewing clamps 17 and pivoting them to a depending position. The vehicle is then jacked up to remove the weight of the vehicle from the bogie, disengaging studs 16 from their seats. Alternately, the pneumatic bags could be partially deflated after loosening the clamps to lower the bogie slightly. Next the bogie is rotated approximately 90 degrees from the line of vehicle travel. The bogie is then rolled out from under the vehicle in a direction to allow key slot 15 to disengage from the pin on the vehicle. In FIG. 1 the bogie is shown attached to a trailer having longitudinal chassis members 103, underlaid by lateral members 102 to rest on members 11 and 12 of the bogie to form a lateral opening for passage of coupling member 14 without substantially raising the trailer or lowering the bogie.

It will readily be seen that upon removal of the bogie from the vehicle the main frame of the bogie will tend to fall from its normal upright position until it is stopped by the piston reaching the end of cylinders 50, that position being the limit of relative tilting between the main frame and the subframe of the bogie. If this is permitted to occur, a great deal of effort would be required to erect the heavy main frame and keep it erect while placing the bogie under the vehicle. Applicants have overcome this difficulty by providing hand valve 56 (see FIG. 6) in hydraulic line 55 between the shock absorber cylinders. While the preferred form of the valve is a hand valve because of its simplicity it is contemplated that other well known valves could be used.

Fenders 132 may, if desired, be added to the bogie but are not essential.

We claim:

1. The combination with a vehicle frame of a vehicle supporting bogie comprising a main frame and a plurality of rigid sub-frames separately oscillatably connected to the main frame, wheels rotatably journaled on each of said sub-frames respectively forwardly and rearwardly of the oscillatable connection of the sub-frame with the main frame, pneumatic bag tires on said wheels, quick-release clamp means on said main frame fixedly detachably connecting said bogie to said vehicle frame, sub-frame oscillation controlling means having relatively movable parts respectively connected to said main frame and a said sub-frame, said oscillation controlling means having fluid port means through which fluid is forced upon oscillation of said sub-frame with respect to said main frame, said bogie being further provided with brake means for said wheels and in further combination with a valve controlling said port means, means for restricting fluid flow through said port means while said valve is in an open position, and means actuated simultaneously with said brake means for closing said valve as an incident to brake operation while said vehicle is in motion to control fluid movement through the port.

2. The device of claim 1 in which said means for closing said valve includes a normally open electric switch adapted to be closed upon the actuation of said brake means, electric operating means for said valve, and electrical connections including a source of current connecting said operating means and said switch for electrically actuating said valve.

3. The device of claim 1 further comprising fluid operated means for applying said brake means, said means actuated by said brake means including fluid operated means for closing said valve means, and pressure fluid connections common to said fluid operated brake applying and valve closing means for simultaneously actuating said brake means and closing said valve.

4. The device of claim 1 further comprising manually operated valve means controlling flow through said port means.

5. The device of claim 1 in which said means for restricting fluid flow comprise pressure fluid connections, said connections being of flow restricting diameter relative to the volume of said oscillation controlling means whereby to restrict the speed at which oscillation may occur between the subframe and the main frame independently of the valve means.

6. The device of claim 5 in which a tube oscillatably mounts said subframe on said main frame and is included in said connections, said tube comprising storage means for accumulating fluid under pressure, and hydraulic fluid connections between said tube, said brake, said pneumatic bag, and said valve.

7. The device of claim 1 in which said means for restricting fluid flow comprises said valve, said valve being of flow restricting size relative to the volume of said oscillation controlling means whereby to restrict the speed at which oscillation may occur between the subframe and the main frame independently of said pressure fluid connections.

References Cited in the file of this patent

UNITED STATES PATENTS

| | | |
|---|---|---|
| 494,319 | Brown | Mar. 28, 1893 |
| 1,930,208 | Marcum | Oct. 10, 1933 |
| 1,940,914 | Marcum | Dec. 26, 1933 |
| 2,213,473 | Peterman | Sept. 3, 1940 |
| 2,215,506 | Hollmann et al. | Sept. 24, 1940 |
| 2,291,174 | Stewart | July 28, 1942 |
| 2,328,849 | Schoelm | Sept. 7, 1943 |
| 2,337,615 | McLaren | Dec. 28, 1943 |
| 2,381,425 | Deal et al. | Aug. 7, 1945 |
| 2,391,948 | Couse | Jan. 1, 1946 |
| 2,416,478 | Harbers | Feb. 25, 1947 |
| 2,574,280 | Obert | Nov. 6, 1951 |
| 2,590,962 | Gurton et al. | Apr. 1, 1952 |
| 2,663,569 | Gouirand | Dec. 22, 1953 |
| 2,721,405 | Gardner | Oct. 25, 1955 |
| 2,819,911 | Ranta | Jan. 14, 1958 |
| 2,880,815 | Apfelbaum | Apr. 7, 1959 |